United States Patent
Lee

(10) Patent No.: US 7,528,185 B2
(45) Date of Patent: May 5, 2009

(54) WHITE POLYOLEFIN COMPOSITIONS HAVING REDUCED DIE DROOL

(75) Inventor: Chun D. Lee, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 275 days.

(21) Appl. No.: 11/523,983

(22) Filed: Sep. 20, 2006

(65) Prior Publication Data

US 2007/0037905 A1 Feb. 15, 2007

Related U.S. Application Data

(63) Continuation-in-part of application No. 10/842,925, filed on May 11, 2004, now abandoned.

(51) Int. Cl.
*C08K 5/3447* (2006.01)
*C08K 3/22* (2006.01)
*C08K 3/26* (2006.01)

(52) U.S. Cl. .................. 524/93; 524/394; 524/413; 524/423; 524/427; 524/447; 524/449; 524/451; 524/492; 524/497

(58) Field of Classification Search .......... 524/93, 524/394, 413, 423, 427, 447, 449, 451, 492, 524/497
See application file for complete search history.

(56) References Cited

U.S. PATENT DOCUMENTS

| 2,997,456 | A | 8/1961 | Mills |
| 3,218,276 | A | 11/1965 | Ringwald et al. |
| 4,260,661 | A | 4/1981 | Walters et al. |
| 4,459,380 | A | 7/1984 | Vostovich |
| 4,693,937 | A | 9/1987 | Wu et al. |
| 4,797,323 | A | 1/1989 | Wu et al. |
| 4,808,643 | A | 2/1989 | Lemoine et al. |
| 4,824,883 | A * | 4/1989 | Walter et al. .................. 524/93 |
| 5,008,056 | A | 4/1991 | Kurtz et al. |
| 5,196,462 | A | 3/1993 | Berta |
| 5,277,970 | A * | 1/1994 | Schuhmann et al. ........ 428/323 |
| 6,197,852 | B1 | 3/2001 | Lee |
| 6,326,422 | B1 | 12/2001 | Horwatt |
| 6,392,154 | B1 | 5/2002 | Lee et al. |
| 6,664,317 | B2 * | 12/2003 | King, III ...................... 524/99 |
| 6,919,389 | B2 * | 7/2005 | Enlow et al. .................. 524/89 |
| 2005/0256239 | A1 | 11/2005 | Lee |

OTHER PUBLICATIONS

Gander, J.D., et al.: "Review of Die Lip Build-Up in Plastics Extrusion," SPE ANTEC: May 1996, pp. 1113-1117 (Indianapolis, IN).

* cited by examiner

*Primary Examiner*—Kriellion A Sanders
(74) *Attorney, Agent, or Firm*—William A. Heidrich; Gerald A. Baracka

(57) ABSTRACT

Extrudable white-filled polyolefin compositions which exhibit reduced die drool are provided. More particularly, the compositions are white or opaque compositions comprising a polyolefin, whitening or opacifying inorganic filler and a mercaptobenzimidazole compound.

12 Claims, No Drawings

WHITE POLYOLEFIN COMPOSITIONS HAVING REDUCED DIE DROOL

CROSS-REFERENCE TO RELATED APPLICATION

This is a continuation-in-part of application Ser. No. 10/842,925, filed May 11, 2004 now abandoned.

BACKGROUND OF THE INVENTION

1. Field of the Invention

The invention relates to extrudable white polyolefin compositions which exhibit reduced die lip build-up during extrusion. More specifically, the compositions contain a low density polyethylene, a whitening or opacifying filler and a die drool-reducing amount of mercaptobenzimidazole compound 2. Brief Description of the Prior Art Inorganic fillers are commonly incorporated in polyolefin resins for a variety of purposes. For example, inorganic fillers may be employed to reduce cost, impart flame retardancy, improve modulus or toughness, impart opacity, impart printability/writeability, impart ultraviolet (UV) resistance and the like. The amount and type of polyolefin used and inorganic filler incorporated can vary widely depending on the intended end-use application.

Whitening or opacifying inorganic fillers, such as titanium dioxide and calcium carbonate, are widely used in the production of white or opaque polyolefin packaging films. Films of this type may be used individually or incorporated as one of the layers in a coextruded multi-layer film construction. White films are commonly employed where a white background for printing is desired and to protect packaged foods which are sensitive to light exposure.

The problems associated with the high-speed extrusion of filled polyolefins and subsequent forming operations are well documented. For example, U.S. Pat. No. 5,277,970 describes the tendency of opaque, vacuole-containing films to develop undesirable, stripe-like markings of varying intensity in the longitudinal direction when processed on high-speed automatic packaging machines and discloses multi-layered white film resistant to the development of such marking.

The presence of inorganic fillers is also known to contribute to undesirable die lip build-up during extrusion/coextrusion. Dip lip build-up, also referred to as die drool, die drip or plate out, is the undesirable accumulation of polymer on the open face of a die. Die lip build-up can change the geometry of the die exit and cause surface roughness of the extrudates. Also, the built-up material can periodically break free and cause localized surface defects. If die drool is excessive it may require periodic shut down to clean dies and/or it may require operating at reduced line speeds. A discussion of the problems associated with die lip build-up and the various factors which contribute to this phenomenon and a review of common methods suggested to minimize or eliminate die lip build-up problems is provided in a paper presented by J. D. Gander and A. J. Giacomin, SPE ANTEC, Indianapolis (May 1996), pages 1113-1117.

One approach to reducing die drool is the use of additives that function as processing aids/lubricants for the polyolefin. Fluoropolymer additives have been widely used for this purpose. There is a continuing need to provide new and improved white-filled polyolefin compositions which exhibit reduced die lip build-up upon extrusion. It would be particularly desirable if these compositions utilized readily available and low cost additives.

Benzimidazole compounds have been used as stabilizers for polyolefins to prevent degradation caused by oxidative, thermal and ultraviolet exposure. For example, U.S. Pat. No. 3,218,276 discloses polypropylene fiber-forming compositions protected against thermal and ultraviolet degradation containing 0.2 to 2 percent $C_{3-20}$ alkyl-substituted benzimidazole. U.S. Pat. No. 2,997,456 teaches the use of metallic mercaptobenzimidazole compounds as stabilizers for polymers of 1-olefins, primarily polypropylene, to protect against molecular degradation under conditions of elevated temperature and/or mechanical working. Zinc mercaptobenzimidaole is specifically mentioned.

Combinations of hindered phenols with various zinc salts of mercapto compounds to stabilize crosslinkable polyolefin insulation compositions is taught in U.S. Pat. Nos. 4,260,661; 4,693,9837; 4,797,323 and 4,824,883. For example, combinations of IRGANOX 1010 with the zinc salts of 2-mercaptobenzimidazole and 2-mercaptotoylimidazole are disclosed.

Other references which disclose benzimidazole stabilizers for crosslinkable elastomeric polymeric materials include U.S. Pat. Nos. 4,459,380; 4,808,643 and 5,196,462.

U.S. Pat. No. 6,197,852 discloses the use of mercaptobenzimidazole compounds for carbon black-filled concentrates having improved resistance to thermo-oxidative degradation and improved dispersion of carbon black.

SUMMARY

It is an object of the present invention to provide extrudable white-filled polyolefin compositions which exhibit reduced die drool. It is a further object to provide white or opaque low density polyethylene compositions having reduced die lip build-up.

The improved compositions of the invention, which can include both concentrates and formulated compositions produced therefrom, comprise 20 to 97.5 weight percent, based on the weight of the composition, polyolefin resin, said polyolefin having a melt index from 0.5 to 50 g/10 min; 2.5 to 80 weight percent, based on the weight of the composition, whitening/opacifying inorganic filler; and 0.01 to 1 weight percent, based on the weight of the composition, mercaptobenzimidazole compound of the formula

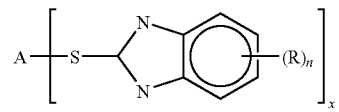

where A is hydrogen or zinc, R is a $C_{1-4}$ alkyl group, n is 0 to 4 and x is 1 or 2.

The mercaptobenzimidazole compound is preferably 2-mercaptotolyl-imidazole, 2-mercaptobenzimidazole, zinc-2-mercaptobenzimidazole or zinc 2-mercaptotolyl-imidazole. Useful whitening/opacifying inorganic fillers include titanium dioxide, calcium carbonate, barium sulfate, silica, silica dioxide, talc, mica and kaolin.

White-filled compositions containing titanium dioxide and calcium carbonate fillers, especially those wherein the average particle size of the filler is in the range 0.1 to 10 microns, are particularly useful.

In one highly useful embodiment, the compositions are white-filled concentrates and contain 20 to 60 weight percent polyolefin, preferably low density polyethylene, 40 to 80 weight percent filler and 0.05 to 0.5 weight percent mercaptobenzimidazole compound. In another highly useful embodiment, white-filled compositions suitable for the manufacture of finished goods utilizing extrusion or coextrusion processes are produced. These compositions contain 2.5 to less than 40 weight percent filler, greater than 60 and up to 97.5 weight percent polyolefin, preferably low density polyethylene, linear low density polyethylene or mixtures thereof, and 0.05 to 0.5 weight percent mercaptobenzimidazole. It is even more advantageous if these compositions additionally contain 0.1 to 1 weight percent processing aid and/or 0.1 to 1 weight percent hindered phenol stabilizer.

DETAILED DESCRIPTION

The present invention relates to extrudable white polyolefin compositions having reduced die drool. As used herein the term white polyolefin compositions refers to compositions which are white or opaque. The degree of whiteness/opacity will vary depending on the type and amount of the filler incorporated in the polyolefin.

The compositions in their broadest terms are comprised of a polyolefin capable of being extruded, an inorganic filler capable of imparting the desired degree of whiteness/opacity and a die drool-reducing amount of mercaptobenzimidazole compound. Optionally, one or more additional additives commonly used in extrusion compositions, such as stabilizers and processing aids, may be included in the composition.

Conventional polyolefin resins suitable for use in extrusion processes can be employed for the invention. These include ethylene homopolymers and copolymers, propylene homopolymers and copolymers and mixtures thereof having melt indexes (MIs) in the range from about 0.5 to 50 g/10 min determined in accordance with ASTM D 1238-01, condition 190/2.16. It is particularly advantageous to use polyolefins having MIs from about 2 to 40 g/10 min. The polyolefin resin component will constitute 20 to 97.5 weight percent (wt. %) of the total composition.

Useful ethylene homopolymers and copolymers within the specified MI range are available from commercial sources and include low density polyethylene (LDPE), linear low density polyethylene (LLDPE), medium density polyethylene (MDPE) and high density polyethylene (HDPE). Copolymers containing minor amounts of $C_{3-8}$ α-olefin comonomers such as propylene, butene-1, hexene-1 and octene-1 are particularly useful; however, copolymers of ethylene with comonomers having functional groups such as vinyl carboxylates, alkyl acrylates and alkyl methacrylates may also be used. Ethylene-vinyl acetate and ethylene-n-butyl acrylate copolymers are useful copolymers of the latter type. Copolymers of ethylene with butene-1 and hexene-1, particularly low density copolymers, are highly useful polyethylene resins for the invention.

Densities of the ethylene homopolymers and copolymers can be as high as 0.965 g/cm³ but are most advantageously from 0.910 to 0.950 g/cm³ For white-filled compositions and particularly when concentrates or masterbatches are prepared, LDPEs and LLDPEs having densities from 0.915 to 0.930 g/cm³ are highly useful. LDPEs having densities from 0.915 to 0.925 are particularly advantageous for formulating high white-filled compositions in view of their ready processability and the ease of incorporating the high filler loadings. Densities referred to herein are determined in accordance with ASTM D 1505.

Useful propylene polymers include polypropylene (PP), i.e., propylene homopolymer, random copolymers of propylene with ethylene or a $C_{4-6}$ α-olefin and impact propylene-ethylene copolymers which can include thermoplastic polyolefins (TPOs) and thermoplastic polyolefin elastomers (TPOEs). The impact copolymers can be either reactor-made intimate mixtures of polypropylene and ethylene-propylene copolymer or conventional blends obtained by physically mixing the polypropylene and ethylene-propylene copolymer components.

Inorganic fillers which can be used include any filler material known to be useful for whitening/opacifying purposes. By way of illustration, these can include titanium dioxide, calcium carbonate, barium sulfate, silica, silica dioxide, talc, mica, kaolin and the like. The filler component constitutes from 2.5 to 80 wt. % of the total composition.

In one highly useful embodiment of the invention the inorganic filler is titanium dioxide ($TiO_2$) which can be of either the anatase or rutile form. Due to its superior opacity, the rutile form is preferably employed. The titanium dioxide may be surface treated, i.e., coated in accordance with known procedures. For example, the titanium dioxide particles may be coated with organic compounds or inorganic oxides where specific applications dictate. In another highly useful embodiment, the inorganic filler is calcium carbonate.

Average particle size of the inorganic filler will typically range from about 0.05 up to about 50 microns. While smaller particle size fillers provide a greater whitening/opacifying effect and better performance, they are typically harder to disperse. White compositions wherein the whitening/opacifying filler, particularly $TiO_2$ or calcium carbonate, has a particle size in the range 0.1 to 10 microns are particularly useful.

A mercaptobenzimidazole compound is included in the formulation with the polyolefin base resin and filler in order to reduce die lip buildup in accordance with the invention. Useful mercaptobenzimidazole compounds for the invention correspond to the following formula

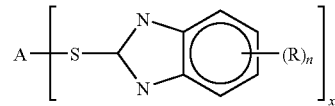

where A is hydrogen or zinc, R is a $C_{1-4}$ alkyl group, n is 0 to 4 and x is 1 or 2. Preferably, R is methyl and n is 0 or 1. Preferred mercaptobenzimidazole compounds include 2-mercaptotolylimidazole (MTI), 2-mercaptobenzimidazole (MBI), zinc-2-mercaptobenzimidazole (ZMBI) and zinc 2-mercaptotolylimidazole (ZMTI). Whereas mercaptobenzimidazoles of the above types have been used as stabilizers for crosslink able polymers and as an adjuvant to facilitate dispersion of carbon black in carbon black concentrates they have not been utilized in white/opaque formulations to reduce die drool.

The mercaptobenzimidazole compound is used in an amount from 0.01 to 1 wt. %, based on the weight of the total composition. In a highly useful embodiment, compositions exhibiting significantly reduced die lip build-up contain from 0.05 to 0.5 wt. % of the mercaptobenzimidazole compound. The amount of mercaptobenzimidazole compound required to effectively reduce die drool will depend on the particular polyolefin and inorganic filler used, the relative percentages of each, the type and the amount of other resins/additives included in the formulation, the application involved and processing/operating conditions employed. As a general rule, however, all other things being equal, die lip build-up increases as the amount of filler is increased. Accordingly, it may be advantageous to use higher levels of the mercaptobenzimidazole compound and include other optional processing aids when formulating highly filled white compositions, e.g., concentrates.

Conventional additives may also be included in the composition in accordance with known formulation procedures. These additives can include antioxidants, light and heat stabilizers, processing aids, nucleating agents, flame retarding agents, metal deactivators and the like. Additives of this type are known in the art and are generally used at relatively low levels, i.e., not exceeding 2% on a combined basis. Since mercaptobenzimidazole compounds are known to impart antioxidative properties, incorporation of additional antioxidants and stabilizers may not be necessary except for the most rigorous applications and/or processing conditions.

In one highly useful embodiment of the invention 0.1 to 1 wt. % of a hindered phenol stabilizer is included in the formulation. Useful hindered phenols used will contain one or more substituted phenyl groups of the formula

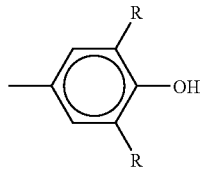

where R is a $C_{1-4}$ alkyl group and, most preferably, a tertiary butyl group. Where more than one, 3,5-dialkyl-4-hydroxyphenyl group is present, they will be joined through a linking group and the resulting compounds will correspond to the formula

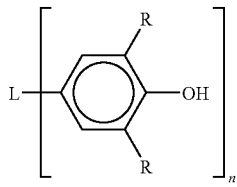

where n is an integer from 2 to 4 and L represents the linking group.

Representative linking groups can include:

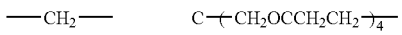 

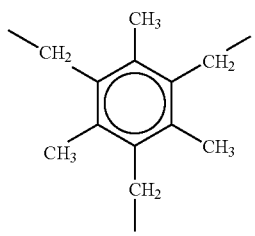

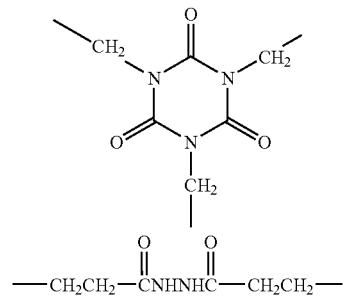

It is especially advantageous when the above-identified linking moieties are substituted with 3,5-di-t-butyl-4-hydroxyphenyl groups. Representative hindered phenol compounds of the above types include:

4,4'-methylenebis(2,6-di-t-butylphenol);
tetrakis[methylene (3,5-di-t-butyl-4-hydroxyhydrocinnamate)methane;
1,3,5-trimethyl-2,4,6-tris(3,5-di-t-butyl-4-hydroxybenzyl)-benzene;
1,3,5-tris(3,5-di-t-butyl-4-hydroxybenzyl)-s-triazine 2,4,6 (1H,3H,5H)trione;
N,N'-bis[3-(3,5-di-t-butyl-4-hydroxyphenyl)propanyl]-hydrazine; and
octadecyl 3,5-di-t-butyl-4-hydroxyhydrocinnamate.

All of the foregoing materials are commercially available. Tetrakis[methylene (3,5-di-t-butyl-4-hydroxyhydrocinnamate)]methane and octadecyl 3,5-di-t-butyl-4-hydroxyhydrocinnamate are particularly useful hindered phenols which can be used in conjunction with the mercaptobenzimidazole compound for the compositions of the invention.

In another highly useful embodiment, 0.1 to 1 wt. % of a processing aid is included in the formulation. Conventional processing aids such as fatty acids, fatty acid metal soaps, fatty acid amides, long chain aliphatic amides, fatty acid esters, silicone oils, natural and synthetic hydrocarbon waxes, low molecular weight polyethylene waxes, low molecular weight aliphatic resins and combinations thereof can be used for this purpose. Compositions wherein a fatty acid metal soap, such as calcium stearate or aluminum stearate, is employed in combination with the mercaptobenzimidazole compound are particularly advantageous.

To prepare the compositions, all of the ingredients can be dry blended and used as such or, as is more typically the case, melt blended prior to use. This latter procedure insures intimate mixing of the filler, mercaptobenzimidazole compound and any optional additives prior to extrusion since many extrusion operations do not utilize extruders having sufficient mixing zones to insure homogeneity of the extrudate. Mixers capable of imparting high shear, such as Banbury mixers, twin screw extruders or the like, can be used to accomplish the melt blending. Another useful approach in preparing the compositions is to prepare a concentrate or masterbatch of the base resin or another readily processible polyolefin resin which contains the inorganic filler, mercaptobenzimidazole compound and any optional ingredients and then to "let down" the concentrate in the base resin during the melt blending operation to produce the final formulation.

The compositions of the invention can be utilized in any operation where a white-filled polyolefin is extruded through a single die opening, such as a slit or circular die, or multiple die opening. While they are particularly effective in reducing die lip build-up in film extrusion and coextrusion processes they can also be advantageously utilized for extrusion coating, wire and cable coating, blow molding, film blowing, fiber spinning and the like. Reduced die drool is also observed when a concentrate is processed and extruded, such as when the concentrate is pelletized using a strand cutter.

In their most general terms, the white-filled compositions of the invention will contain from 20 to 97.5 wt. % polyolefin resin, 2.5 to 80 wt. % of white or opacifying filler and 0.01 to 1 wt. % mercaptobenzimidazole compound. White-filled concentrate compositions having reduced die-lip build-up contain 40 to 80 wt. % and, more preferably, 45 to 70 wt. % filler, 20 to 60 wt. % and, more preferably, 30 to 55 wt. % polyolefin and 0.05 to 0.5 wt. % mercaptobenzimidazole. The polyolefin resin is most advantageously LDPE when producing $TiO_2$ concentrates. Concentrates of the above types are commonly used as "let down" resins in commercial operations for the extrusion of manufactured goods, e.g., films. Concentrates employed for this purpose are typically in pelletized form and the ability to reduce die drool using concentrate compositions of the invention significantly reduces problems during the pelletization operation.

Additionally, significant benefit, i.e., reduction in die drool, is realized utilizing compositions containing lower loadings of the white-filler component, such as would be utilized for the production of finished products after the above-described concentrates have been let down into a base resin or where a base resin is directly mixed with the white filler, mercaptobenzimidazole and any optional ingredients. Such white-filled compositions would typically contain 2.5 to less than 40 wt. % filler, greater than 60 and up to 97.5 wt. % polyolefin and 0.05 to 0.5 wt. % mercaptobenzimidazole. More preferably, white-filled extrudable compositions of the invention utilized to produce finished goods and which exhibit redued die drool contain 5 to 25 wt. % of the white filler, most preferably $TiO_2$, 75 to 95 wt. % polyolefin and 0.05 to 0.5 mercaptobenzimidazole. In a highly useful embodiment the polyolefin is LDPE, LLDPE or mixtures thereof.

In another embodiment of the invention compositions useful for extrusion coating photographic papers will contain 85 to 90 wt. % LDPE, 10 to 15 wt. % $TiO_2$ and 0.05 to 0.5 wt. % mercaptobenzimidazole compound. In still another useful embodiment, compositions useful as extrusion coatings for Kraft papers and the like contain 90 to 95 wt. % LDPE, 5 to 10 wt. % calcium carbonate and 0.05 to 0.5 wt % mercaptobenzimidazole compound.

The following examples illustrate the invention more fully. Unless otherwise indicated, all parts and percentages in the examples are on a weight basis.

Concentrates employed for the examples were prepared using a Farrel OOC Banbury mixer having a capacity of 2400 cc. All of the ingredients were first dry-blended and then charged to the preheated (35° C.) chamber of the Banbury mixer. A pressure of 40 psi was then applied with mixing (125 rpm). When flux was achieved, i.e., the temperature of the mixture in the chamber reached approximately 132° C. (usually about 40-50 seconds), the ram was raised for 15 seconds and any material collected in the throat of the mixer scraped into the mixing chamber. Pressure was reapplied and mixing continued for at least 3 minutes or until the temperature reached 171° C. The melt was then pelletized at 182° C. using a 2.25 inch single screw extruder (L/D=23; 10 rpm) connected to an underwater pelletizer. For Example 1 and Comparative Example 2 concentrates were let-down into the appropriate amount of the polyolefin resin in order to obtain the extrusion composition.

EXAMPLE 1

A white composition suitable for extrusion coating and coextrusion was prepared in accordance with the invention. The composition was comprised as follows:

50% LDPE (MI 5.6 g/10 min; density, 0.923 g/cm$^3$)

25% LDPE (MI 9 g/10 min; density, 0.923 g/cm$^3$)

24.7% $TiO_2$ (Rutile; average particle size 0.2 microns)

0.2% Aluminum Stearate (AlSt)

0.1% Zinc 2-mercaptotolylimidazole (ZMTI)

The composition was prepared by letting down one part of a concentrate prepared as described above and containing 50% $TiO_2$, 49.4% of the 9 MI LDPE, 0.4% AlSt and 0.2% ZMTI into one part of the 5.6 MI LDPE.

To evaluate die lip build-up the composition was then extruded at 235° C. using a Haake twin screw equipped with a 1½ inch slit die with 40 mil opening. The extruder was operated at 150 rpm. As the extrusion proceeded, the die lip was examined after one hour and at 30 minute intervals thereafter and the width of the amount of drool accumulated on the lip of the die measured. The amount of accumulated die drool was reported as a percentage of the overall die width. Die drool results obtained for the white composition prepared above were as follows:

| 60 minutes | 5% build-up |
|---|---|
| 90 minutes | 15% build-up |
| 120 minutes | 30% build-up |
| 150 minutes | 40% build-up |
| 180 minutes | 45% build-up |

COMPARATIVE EXAMPLE 2

To demonstrate the significance of the above results a comparative formulation was prepared and evaluated. The comparative formulation was identical in all respects to that of Example 1 except that the ZMTI was omitted and replaced with 0.1% of a hindered phenol antioxidant (Irganox 1010)—a conventional stabilizer additive commonly used in filled polyolefin compositions All of the procedures used to prepare and evaluate the comparative composition were identical to that described for Example 1. Die lip build-up obtained for the comparative composition was significantly greater than obtained with the composition of the invention (Example 1) as evidenced by the following test results.

| 60 minutes | 40% build-up |
|---|---|
| 90 minutes | 80% build-up |
| 120 minutes | 90% build-up |
| 150 minutes | 95% build-up |

EXAMPLES 3 AND 4 AND COMPARATIVE EXAMPLE 5

Following the general procedure described above for the preparation of concentrates, white-filled concentrates were prepared as follows:

|  | Example 3 | Example 4 | Comparative Example 5 |
|---|---|---|---|
| LDPE | 50 | 50 | 50 |
| TiO$_2$ | 49.3 | 49.3 | 49.3 |
| AlSt | 0.3 | 0.3 | 0.3 |
| ZMTI | 0.2 | — | — |
| MTI | — | 0.2 | — |
| Irganox 1010 | — | — | 0.2 |

The LDPE used had an MI of 9 g/10 min and density of 0.923 g/cm$^3$. Rather than letting the concentrates down into additional resin, the concentrates were evaluated directly for die lip build-up during extrusion. Extrusion of highly filled compositions is considered to be a more rigorous test and considerably shortens the time required for testing. Die lip build-up results obtained for the above white concentrates were as follows:

|  | Percentage Die Lip Build-up | | |
|---|---|---|---|
| Extrusion Time | Example 3 | Example 4 | Comparative Example 5 |
| 5 minutes | 25 | 30 | 80 |
| 10 minutes | 30 | 45 | 90 |
| 20 minutes | 45 | 50 | 95 |
| 40 minutes | 50 | 50 | 98 |

The unexpected marked reduction in die drool obtained with the white concentrates of the invention is apparent from the above results.

EXAMPLE 6

When a mercaptobenzimidazole compound is employed in conjunction with a hindered phenol compound, comparable reductions in die drool are possible. For example, using 0.2% of a mixture comprised of equal parts of ZMTI and Irganox 1010 in a concentrate containing 50% LDPE, 49.3% TiO$_2$ and 0.3% AlSt gives results comparable to those of Examples 3 and 4.

I claim:

1. Extrudable white-filled polyolefin concentrate compositions consisting essentially of:
   (a) 20 to 60 weight percent, based on the total weight of the composition, low density polyethylene or linear low density polyethylene having a melt index from 0.5 to 50 g/10 mm and density from 0.915 to 0.930 g/cm$^3$;
   (b) 40 to 80 weight percent, based on the total weight of the composition, titanium dioxide or calcium carbonate; and
   (c) 0.01 to 1 weight percent, based on the total weight of the composition, mercaptobenzimidazole compound of the formula

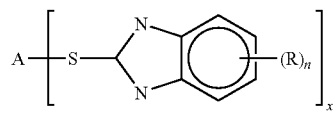

where A is hydrogen or zinc, R is a C$_{1-4}$ alkyl group, n is 0 to 4 and x is 1 or 2.

2. The composition of claim 1 wherein R is methyl and n is 0 or 1.

3. The composition of claim 2 wherein (b) is titanium dioxide and (c) is selected from the group consisting of 2-mercaptotolylimidazole, 2-mercaptobenzimidazole, zinc-2-mercaptobenzimidazole and zinc 2-mercaptotolyimidazole.

4. The composition of claim 3 wherein the titanium dioxide has an average particle size from 0.1 to 10 microns.

5. The composition of claim 1 which additionally contains 0.1 to 1 weight percent, based on the weight of the composition, processing aid.

6. The composition of claim 5 wherein the processing aid is a fatty acid metal soap.

7. The composition of claim 6 wherein the processing aid is aluminum stearate.

8. The composition of claim 1 which additionally contains 0.1 to 1 weight percent, based on the weight of the composition, hindered phenol stabilizer.

9. The composition of claim 8 wherein the hindered phenol stabilizer is selected from the groups consisting of 4,4'-methylenebis(2,6-di-t-butylphenol), tetrakis [methylene(3,5-di-t-butyl-4-hydroxyhydrocinnamate)methane, 1,3,5-trimethyl-2,4,6-tris(3,5-di-t-butyl-4-hydroxybenzyl)-benzene, 1,3,5-tris(3,5-di-t-butyl-4-hydroxybenzyl)-s-triazine 2,4,6 (1H,3H,5H)trione, N,N'-bis[3-(3,5-di-t-butyl-4-hydroxyphenyl)propanyl]-hydrazine and, octadecyl 3,5-di-t-butyl-4-hydroxyhydrocinnamate.

10. The composition of claim 1 containing 0.05 to 0.5 weight percent (c).

11. The composition of claim 10 wherein (a) is low density polyethylene and (b) is titanium dioxide.

12. The composition of claim 11 containing 30 to 55 weight percent (a) and 45 to 70 weight percent (b).

* * * * *